United States Patent Office 2,835,565
Patented May 20, 1958

2,835,565

AMINATION PRODUCTS OF CONJUGATED DIOLEFINS AS DEFOLIANT ACTIVATORS

Lyle D. Goodhue and Roy E. Stansbury, Bartlesville, Okla., assignors to Phillips Petroleum Company, a corporation of Delaware No Drawing. Application January 2, 1952
Serial No. 264,642

31 Claims. (Cl. 71—2.7)

This invention relates to defoliation of plants, for example, cotton and bean plants. In one aspect, it relates to a synergism of defoliating activity of selected organic polysulfides, that is, the invention relates to compositions of selected organic polysulfides and certain synergists therefor, the allover composition having a greater defoliating activity than the sum of the individual materials thereof. According to the invention, amination products of conjugated diolefins have been found to be activators for increasing the defoliating activity of selected organic polysulfides.

Plant defoliating agents are used to expedite the harvest of cotton, soybeans, tomatoes and other crops. Their purpose is to provide an effect similar to that produced by a light frost, namely dropping of the leaves from the plant. A frost or other shock to the plant foliage causes the plant to react by forming abscission layers of cells across the petiole of the leaves which results in leaf drop. In the case of cotton this is especially valuable whether the crop is mechanically picked or hand picked. For example, defoliating at a certain stage in the life of cotton plants causes uniform opening of bolls and permits substantially complete picking in a single pass. Other advantages such as clean product, decreased insect pests and the like are also realized from timely defoliation of growing cotton. In the case of tomatoes, string beans and the like the harvest is expedited by defoliation since the pickers do not have to search for the crop. In a similar manner other plants may be advantageously defoliated with resultant benefits such as forced ripening of fruit, ease of picking and the like.

It should be noted especially that the compositions of the present invention operate to cause leaves to actually drop from the plant treated and to this extent are, when properly applied, not herbicides which actually kill the plant before it can shed its leaves. In Serial No. 153,994 filed April 4, 1950, by Lyle D. Goodhue and Carolyn E. Tissol, now Patent Number 2,668,103, there have been disclosed and claimed plant defoliating agents comprising as an effective ingredient thereof organic polysulfides of the general formula $RS_{(x)}R'$ wherein R and R' represent straight-chain or branched-chain alkyl groups, cycloalkyl groups, aryl groups, combinations thereof such as alkyl, cycloalkyl, alkaryl, and the like and $(x)$ represents an integer from 2 to 5 and wherein R and R' each contain at least 3 and not more than 10 carbon atoms and are not necessarily identical.

Typical polysulfides within the scope of the above formula when $(x)$ is two include di-tert-hexyl disulfide, di-tert-octyl disulfide, di-tert-decyl disulfide, di-n-hexyl disulfide, di-cyclohexyl disulfide, and the like. When $(x)$ is 3 or more typical compounds include di-tert-butyl polysulfide, di-tert-hexyl polysulfide, di-n-butyl polysulfide, and the like. Said materials are disclosed and claimed as plant defoliants in above-mentioned Serial No. 153,994 filed April 4, 1950, by Goodhue and Tissol.

We have now discovered that conjugated diolefin amination products are effective activators for increasing the defoliating action of the organic polysulfides discussed hereinabove.

When used in combination with the foregoing polysulfides in the manner taught by the present invention, our activators provide compositions having greater plant defoliating activity than either of the active components comprised therein provide when tested separately. Compounds of the present invention comprise the products obtained from the amination of conjugated diolefins such as 1,3-butadiene with ammonia or a suitable primary or secondary amine. One method for the production of amination products of conjugated diolefins is disclosed and claimed in copending Serial No. 135,290 filed December 27, 1949, by John E. Mahan and Kenneth F. Bursack, and now abandoned. A typical reaction of this nature comprises the amination of 1,3-butadiene with ammonia over a catalyst such as sodium hydride. It has been found that the reactor effluent from the reaction of ammonia and a conjugated diolefin is composed of mono-, di-, and tri-alkenylamines, higher-boiling amines and nitrogen-containing materials which do not react with hydrochloric acid to form water soluble hydrochlorides. The reaction effluent may be employed per se for the purpose of the present invention or it may be separated by fractional distillation or other suitable means and fractions thereof used in the practice of the present invention. Conjugated diolefins and amines from which the activators of the present invention can be prepared are fully disclosed in the above-identified application, Serial No. 135,290, filed December 27, 1949, by John E. Mahan and Kenneth F. Bursack, and include isoprene (2-methyl-1,3-butadiene), piperylene (1,3-pentadiene), 1-phenyl-1,3-butadiene, 2,3-dimethyl-1,3-butadiene, and 2-nitro-1,3-butadiene (the term butadiene compounds when used in this specification and claims is to include all of the above compounds also butadiene itself); methylamine, N-methylpropylamine, dibutylamine, aniline, diphenylamine, N-methylaniline, toluidines, benzylamine, morpholine, diisobutylamine, cyclohexylamine, cyclopropylamine, piperidine, nitroaniline, chloroaniline, xylidine, phenetadine, cresidine, anisidine, aminopyridine, aminothiazol, cumidine, mesidine, octylamine, amylamine, 1-ethoxyethylamine.

According to the method, disclosed and claimed in copending Serial No. 135,290, filed December 27, 1949, by John E. Mahan and Kenneth F. Bursack, a conjugated diolefin, for example, 1,3-butadiene, is admixed with a compound of the formula

described hereinabove, in a mol ratio of the nitrogen compound to butadiene in the range of 0.33:1 to 30:1. Generally, it may be considered that a preferred range is 1:1 to 15:1. Admixed with the butadiene compound and nitrogen compound, which is ammonia or which may be considered to be a substituted ammonia, is a catalyst selected from the group consisting of alkali metal hydrides and sodamide comprising 0.05 to 15 weight percent of the materials charged, but preferably 0.1 to 4 weight percent of these materials. This admixture is then heated to a temperature in the range of 50 to 500° F. The reaction pressure will be such that the reaction mixture will be maintained substantially in the liquid phase. At the reaction temperature, the pressure will usually be at least in the range of 180 to 1200 pounds per square inch gauge. Often it is preferred that the temperatures and pressures are in the range of 90 to 250° F. and 180 to 1000 pounds per square inch gauge. Generally, however, higher temperatures are preferred when the material reacting with the conjugated diolefin is an amine rather than ammonia. The admixture is maintained at the desired temperature and pressure for a period of time in the range of 1 minute to 25 hours, but preferably in the range of 5 minutes to 10 hours, depending on whether ammonia or an amine is used as one of the reactants. Usually a somewhat longer reaction time is necessary when the amines are used instead of ammonia. Often when using ammonia quite short reaction times may be used such as in the range of 5 minutes to 3 hours. Suitable means for agitating the admixture are employed which may be any conventional mechanical stirring apparatus.

After the conjugated diolefin such as butadiene and the nitrogen-containing compound have reacted for an adequate time in contact with one or a combination of the catalysts described herein, the reaction effluent is passed to suitable separating means, such as fractional distillation columns or the like, where unchanged reactants are removed for recycling and where the alkenylamines are recovered. The product of the process may include three distinct amines: monoalkenylamines, dialkenylamines, and trialkenylamines with the double bond in each case in the 2 position in the butadiene nucleus, in addition to higher boiling amines and non-basic nitrogen-containing polymer.

For example, if a butadiene compound is reacted with ammonia, such as in the following equation

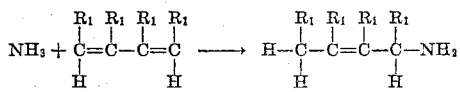

1,4 addition takes place and the corresponding 2-butenylamine is formed.

Suitable equipment for carrying out the preparation is that which will withstand the process temperatures and pressures, and which is equipped with suitable means of agitation. Such equipment is well known to those skilled in the art. For example, an autoclave built to withstand pressures of 1200 pounds per square inch and better, and equipped with adequate heating apparatus and stirring mechanism will be very satisfactory.

In the above formula, each R is selected from the group consisting of hydrogen, alkyl, aryl, aralkyl, alkaryl, cycloalkyl and heterocyclic radicals; and both R's together can be selected from hydrocarbon radicals forming a heterocyclic ring with the nitrogen atom; the number of carbon atoms in both R's not exceeding a total of 36.

A typical amination run wherein 1,3-butadiene was reacted with anhydrous ammonia in the liquid phase in the presence of sodium hydride catalyst is described below:

A pressure reactor of 1400 cc. capacity was carefully cleaned and dried and purged of air with nitrogen. The catalyst and reactants were charged to the reactor, said reactor warmed to room temperature quickly and then placed in a 96° F. water bath. Information and results of the run are given below:

| | |
|---|---|
| Temperature, °F. | 96 |
| Duration, hours | 0.5 |
| Charge, grams: | |
|    Sodium hydride | 1.0 |
|    Ammonia | 416.0 |
|    1,3-butadiene | 109.4 |
| Material recovered, grams: | |
|    Ammonia | 384.3 |
|    1,3-butadiene | 58.2 |
| A. Material which formed water-soluble hydrochlorides with hydrochloric acid: | |
|    Monobutenylamine | 8.7 |
|    Dibutenylamine | 2.2 |
|    Tributenylamine | 13.5 |
|    High boiling amines | 11.1 |
| B. Nitrogen-containing material which did not react with hydrochloric acid to form water-soluble hydrochlorides | 30.2 |

The products were recovered from the reaction mixture from a typical run as follows: First, unreacted butadiene and ammonia were weathered off and recovered. Cracked ice was added to the remaining liquid which was then acidified, to neutralize the amines, by adding a slight excess of hydrochloric acid. This mixture was then extracted with ether to remove the products which did not react with the acid. This portion of the product was recovered by flashing off the ether.

Following the ether extraction, the acidic, aqueous solution was made strongly alkaline. The basic materials were then extracted with ether. After drying the ether extract, the ether was flashed off, and then the basic product was fractionated to separate the various butenylamines and high boiling basic products.

The various fractions as identified above, i. e., higher boiling amines, tributenylamine, etc., were collected from several typical runs to form sizable composite fractions.

The activators of the present invention can be employed in admixture with a single organic polysulfide or mixture of organic polysulfides as specified hereinbefore. Compositions prepared according to the present invention will be comprised of a conjugated diolefin amination product and an organic polysulfide or mixture of organic polysulfides in a suitable solvent or carrier, said solvent or carrier being present in a sufficient amount to provide convenient application. The activator and organic polysulfide will be present in said compositions in a weight ratio from ¼:1 to 10:1, preferably from ¼:1 to 6:1.

Compositions prepared according to the present invention are effective plant defoliants when applied to plants in any suitable form such as solutions, emulsions, and the like. We have found that it is especially advantageous to apply a composition of the present invention as a solution in an isoparaffinic hydrocarbon. Compositions, their preparation and application, which contain an isoparaffinic hydrocarbon solvent are described and claimed in application Serial Number 208,654, filed January 30, 1951, by Lyle D. Goodhue and Carolyn E. Tissol, now Patent No. 2,704,246.

Any suitable carrier or solvent can be employed which will not act against the active defoliating agent. When applied to cotton, tomatoes, beans, or other crops, the carrier or solvent must not be harmful thereto. Of course, a solvent having a defoliating action of its own can be employed. Examples of solvents or carriers include non-phytotoxic paraffinic hydrocarbons, preferably isoparaffinic hydrocarbons, which contain not more than 12 carbon atoms. Water can be used advantageously to form emulsions of said compounds for spraying. Such emulsions are preferably of the water-in-oil type (using up to 50 weight percent water) prepared with a suitable emulsifying agent such as Atlas G–672 (glycerol sorbitan laurate). Oil-in-water emulsions employing wetting or emulsifying agents such as Triton X–100 (alkyl aryl polyether alcohol), Dresinate 731 (sodium salt of a disproportionated rosin acid), Tween 20 (sorbitan monolaurate polyethylene oxide) and the like can also be employed. It is usually preferred to employ emulsions or solutions containing from 0.1 to 10 percent by weight of active ingredients.

The defoliant compositions of the present invention will be applied in a sufficient amount to effect the desired defoliation, preferably at a rate to provide from ¼ to 20 pounds per acre, preferably ¼ to 10 pounds per acre, of active ingredients.

EXAMPLE I

Tests were conducted to determine the defoliating action of di-tert-butyl polysulfide [1] and several fractions of ---
[1] A mixture of polysulfides consisting principally of di-tert-butyl trisulfide (50 wt. percent sulfur content).

the butadiene amination product on either young bean plants or on cotton plants. These materials were tested individually and also as mixtures.

Di-tert-butyl polysulfide was applied as a 0.1 weight percent solution in a high boiling isoparaffinic hydrocarbon fraction.[1] Various fractions of the butadiene amination product were made up into aqueous emulsions containing 5 percent by weight of the candidate material and a small amount (0.5 weight percent) of an emulsifying agent. Two small cotton plants were sprayed with each formulation. Mixtures of the polysulfide and the butadiene amination products were tested in various formulations.

Tests were then conducted employing compositions prepared according to the method of the present invention.

Results of the foregoing tests are recorded in Tables I, II, and III.

[1] HF heavy alkylate, an isoparaffinic hydrocarbon fraction boiling in the range 384–522° F. Contains a minimum of 98% of isoparaffinic hydrocarbons. Prepared by the hydrogen fluoride catalyzed alkylation of isobutane with ethylene.

*Table I*

EFFECT OF DI-TERT-BUTYL POLYSULFIDE ON BEANS AND COTTON

[0.05 cc. of isoparaffinic hydrocarbon solution applied per leaf by microsyringe.]

| Compound | Solvent | Concentration, Wt. percent | Leaves Off after X Days | | | | | Final Defoliation, percent |
|---|---|---|---|---|---|---|---|---|
| | | | 2 | 4 | 6 | 8 | 10 | |

TEST PLANT—BEANS

| Di-tert-butyl polysulfide. | HF Alkylate, Isoparaffinic hydrocarbon, non-phytotoxic. | 0.1 | | | | | 0 | 0 |

TEST PLANT—COTTON

| Di-tert-butyl polysulfide. | HF Alkylate, Isoparaffinic hydrocarbon, non-phytotoxic. | 0.1 | | | | | 0 | 0 |

*Table II*

DEFOLIATION TESTS ON COTTON USING FIVE PER CENT EMULSIONS OF 1,3-BUTADIENE AMINATION PRODUCTS

| Compound | Carrier | Concentration, Wt. percent | Leaves off after X Days | | Final Defoliation, percent |
|---|---|---|---|---|---|
| | | | 7 | 14 | |
| Amines which boil above tributenylamine and which form water soluble hydrochlorides with hydrochloric acid. | Water | 5 | 2 | 2 | 33⅓ |
| Tributenylamine | Water | 5 | 0 | 1 | 16⅔ |
| Nitrogen-containing material which did not react with hydrochloric acid to form water-soluble hydrochlorides. | Water | 5 | 2 | 2 | 33⅓ |

*Table III*

FORMULATION TESTS

| | Percent Defoliation |
|---|---|
| Formulation #I, Test Plant—beans:<br>　.05 cc. per leaf<br>　0.1 wt. percent di-tert-butyl polysulfide<br>　0.25 wt. percent amines which boil above tributenylamine and which form water-soluble hydrochlorides with hydrochloric acid.<br>　99.65 wt. percent HF alkylate, isoparaffinic hydrocarbon carrier (non-phytotoxic) | 100 at 8 days. |
| Formulation #I, Test Plant—cotton:<br>　.05 cc. per leaf | 100 at 4 days. |
| Formulation #II, Test Plant—beans:<br>　.05 cc. per leaf<br>　0.1 wt. percent di-tert-butyl polysulfide<br>　0.1 wt. percent amines which boil above tributenylamine and which form water-soluble hydrochlorides with hydrochloric acid.<br>　99.8 wt. percent HF alkylate, isoparaffinic hydrocarbon carrier (non-phytotoxic) | 100 at 6 days. |
| Formulation #III, Test Plant—beans:<br>　.05 cc. per leaf<br>　0.1 wt. percent d-tert-butyl polysulfide<br>　0.5 wt. percent tributenylamine<br>　99.4 wt. percent HF Alkylate, isoparaffinic hydrocarbon carrier (non-phytotoxic). | 75 at 6 days. |
| Formulation #IV, Test Plant—beans:<br>　.05 cc. per leaf<br>　0.1 wt. percent di-tert-butyl polysulfide<br>　0.5 wt. percent of nitrogen-containing material which did not form water soluble hydrochlorides when reacted with hydrochloric acid.<br>　99.4 wt. percent HF alkylate isoparaffinic hydrocarbon (non-phytotoxic) carrier. | 75 at 10 days. |
| Formulation # V, Test Plant—beans:<br>　.05 cc. per leaf<br>　0.1 wt. percent di-tert-butyl polysulfide<br>　0.25 wt. percent of nitrogen-containing material which did not form water soluble hydrochlorides when reacted with hydrochloric acid.<br>　99.65 wt. percent HF alkylate isoparaffinic hydrocarbon (non-phytotoxic) carrier. | 75 at 8 days. |
| Formulation # VI, Test Plant—beans:<br>　.05 cc. per leaf<br>　0.1 wt. percent di-tert-butyl polysulfide<br>　0.25 wt. percent straight run effluent from 1,3-butadiene amination reaction.<br>　99.65 wt. percent HF alkylate, isoparaffinic hydrocarbon carrier (non-phytotoxic). | 100 at 4 days. |

These tests demonstrate that formulations made according to the teaching of the present invention provide a greater than additive defoliating effect on cotton and beans than do the individual materials comprised in said formulations.

Reasonable variation and some modification are possible within the scope of the foregoing disclosure and the appended claims to the invention, the essence of which is that amination products of conjugated diolefins, i. e., alkenylamines, and other amination products of conjugated diolefins, as described, have been found to exhibit a synergistic effect with organic polysulfide plant defoliating compounds and that, therefore, the art has now been provided with an additional advantageous composition and method for plant defoliation. The importance of plant defoliation, and therefore methods and compounds for accomplishing the same, is believed self-evident, particularly in contemplation of picking of cotton and other vegetable products.

We claim:

1. The method for defoliating a plant which comprises applying to said plant an organic polysulfide, having the general formula $RS_{(x)}R'$ wherein R and R' represent one of straight and branched-chain alkyl groups, cycloalkyl groups, aryl groups, and combinations thereof, ($x$) represents an integer from two to five and wherein R and R' each contain at least three and not more than 10 carbon atoms and are not necessarily identical, in admixture with a synergistic proportion of an amination product of a conjugated diolefin, the amount of the admixture applied being effective to cause a desired extent of defoliation.

2. The method for defoliating a plant which comprises applying to said plant an organic polysulfide having the general formula $RS_{(x)}R'$ wherein R and R' represent one of straight and branched-chain alkyl groups, cycloalkyl groups, aryl groups, and combinations thereof, ($x$) represents an integer from two to five and wherein R and R' each contain at least three and not more than 10 carbon atoms and are not necessarily identical, in admixture with a synergistic proportion of an amination product of a conjugated diolefin prepared by reacting a conjugated diolefin with ammonia in the presence of a catalyst selected from the group consisting of sodamide and the alkali metal hydrides and recovering from said reaction alkenylamines and a nitrogen-containing material which does not react with hydrochloric acid to form a water soluble hydrochloride, the amount of the admixture applied being effective to cause a desired extent of defoliation.

3. The method for defoliating a plant which comprises applying to said plant an organic polysulfide having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an alkenylamine product prepared by reacting a butadiene compound with a compound of the formula

wherein each R is selected from the group consisting of hydrogen, alkyl, aryl, aralkyl, alkaryl, cycloalkyl, heterocyclic, and hydrocarbon groups which together with the nitrogen form a heterocyclic ring, the number of carbon atoms in both R's not exceeding a total of 36; said reaction taking place in the presence of a catalyst selected from the group consisting of sodamide and the alkali metal hydrides; and recovering from said reaction alkenylamines and a nitrogen-containing material, the amount of the admixture applied being effective to cause a desired extent of defoliation.

4. The method for defoliating a plant which comprises applying to the said plant in a suitable carrier in an effective amount a composition containing in admixture an organic polysulfide having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, and an amination product of a conjugated diolefin prepared by reacting a 1,3-butadiene compound with a nitrogen-containing compound of the formula

wherein each R is selected from the group consisting of hydrogen, alkyl, aryl, aralkyl, alkaryl, cycloalkyl, heterocyclic, and hydrocarbon groups which together with the nitrogen form a heterocyclic ring, the number of carbon atoms in both R's not exceeding a total of 36: the reactants being present in a mol ratio of nitrogen-containing compound to 1,3-butadiene compound of 0.33:1 to 30:1; reacting said materials in the presence of 0.05 to 15 percent of a catalyst selected from the group consisting of sodamide and the alkali metal hydrides based on the weight of reactants, at a temperature of 50 to 500° F., for a period of 1 minute to 25 hours, and at a pressure sufficient to maintain liquid phase; and recovering said amination product, the said amination product and organic sulfide being present in said compositions in a weight ratio from .25:1 to 10:1.

5. A method for defoliating a cotton plant which comprises applying to said plant a composition containing 0.1 to 10 percent by weight of di-tert-butyl polysulfide and a conjugated diolefin amination product prepared from butadiene and an amine in a liquid phase in the presence of sodium hydride catalyst, the said amination product and said sulfide being present in said composition in a weight ratio of .25:1 to 6:1, the said composition being diluted with a suitable carrier and applied at a rate to provide from ¼ to 20 pounds per acre of said sulfide and said amination product in the ratio as stated herein.

6. The method for defoliating a plant which comprises applying to said plant an organic polysulfide having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an amination product of a conjugated diolefin prepared by reacting a conjugated diolefin with a primary amine in the presence of a catalyst selected from the group consisting of sodamide and the alkali metal hydrides and recovering from said reaction alkenylamines and a nitrogen-containing material which does not react with hydrochloric acid to form a water soluble hydrochloride, the amount of the admixture applied being effective to cause a desired extent of defoliation.

7. The method for defoliating a plant which comprises applying to said plant an organic polysulfide having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proporation of an amination product of a conjugated diolefin prepared by reacting conjugated diolefin with a secondary amine in the presence of a catalyst selected from the group consisting of sodamide and the alkali metal hydrides and recovering from said reaction alkenylamines and a nitrogen-containing material which does not react with hydrochloric acid to form a water soluble hydrochloride, the amount of the admixture applied being effective to cause a desired extent of defoliation.

8. A plant defoliating composition which comprises an organic polysulfide, having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an amination product of a conjugated diolefin.

9. A plant defoliating composition which comprises an organic polysulfide having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an amination product of a conjugated diolefin prepared by reacting conjugated diolefin with ammonia in the presence of a catalyst selected from the group consisting of sodamide and the alkali metal hydrides and recovering from said reaction alkenylamines and a nitrogen-containing material which does not react with hydrochloric acid to form a water soluble hydrochloride.

10. A plant defoliating composition which comprises an organic polysulfide having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an amination product of a conjugated diolefin prepared by reacting a conjugated diolefin with a primary amine in the presence of a catalyst selected from the group consisting of sodamide and the alkali metal hydrides and recovering from said reaction alkenylamines and a nitrogen-containing material which does not react with hydrochloric acid to form a water soluble hydrochloride.

11. A plant defoliating composition which comprises an organic polysulfide having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an amination product of a conjugated diolefin prepared by reacting conjugated diolefin with a secondary amine in the presence of a catalyst selected from the group consisting of sodamide and the alkali metal hydrides and recovering from said reaction alkenylamines and a nitrogen-containing material which does not react with hydrochloric acid to form a water soluble hydrochloride.

12. A plant defoliating composition which comprises an organic polysulfide having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an alkenylamine product prepared by reacting a butadiene compound with a compound of the formula

wherein each R is selected from the group consisting of hydrogen, alkyl, aryl, aralkyl, alkaryl, cycloalkyl, heterocyclic, and hydrocarbon groups which together with the nitrogen form a heterocyclic ring; the number of carbon atoms in both R's not exceeding a total of 36; said reaction taking place in the presence of a catalyst selected from the group consisting of sodamide and the alkali metal hydrides; and recovering from said reaction alkenylamines and a nitrogen-containing material.

13. A plant defoliating composition which comprises in admixture an organic polysulfide having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, and an amination product of a conjugated diolefin prepared by reacting a 1,3-butadiene compound with a nitrogen-containing compound of the formula

wherein each R is selected from the group consisting of hydrogen, alkyl, aryl, aralkyl, alkaryl, cycloalkyl, heterocyclic, and hydrocarbon groups which together with the nitrogen form a heterocyclic ring, the number of carbon atoms in both R's not exceeding of 36; the reactants being present in a mol ratio of nitrogen-containing compound to 1,3-butadiene compound of 0.33:1 to 30:1; reacting said materials in the presence of 0.05 to 15 percent of a catalyst selected from the group consisting of sodamide and the alkali metal hydrides based on the weight of reactants, at a temperature of 50 to 500° F., for a period of 1 minute to 25 hours, and at a pressure sufficient to maintain liquid phase; and recovering said amination product, the said amination product and organic sulfide being present in said compositions in a weight ratio from .25:1 to 10:1.

14. A plant defoliating composition which comprises a composition containing 0.1 to 10 percent by weight of di-tert-butyl polysulfide and a conjugated diolefin amination product prepared from butadiene and amine in a liquid phase in the presence of sodium hydride catalyst, the said amination product and said sulfide being present in said composition in a weight ratio of .25:1 to 6:1, the said composition being diluted with a suitable carrier and applied at a rate to provide from ¼ to 20 pounds per acre of said sulfide and said amination product in the ratio as stated herein.

15. A plant defoliating composition which comprises a di-tert-butyl polysulfide and tributenylamine in a ratio of from .25:1 to 6:1.

16. A plant defoliating composition which comprises an organic polysulfide having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture in synergistic proportions with an amine which boils above tributenylamine and which forms a water-soluble hydrochloride with hydrochloric acid and which is obtained by amination of a conjugated diolefin by reacting a conjugated diolefin with an amine in the presence of a catalyst.

17. A plant defoliating composition which comprises an organic polysulfide having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture in synergistic proportions with a nitrogen-containing material which does not react with hydrochloric acid to form a water-soluble hydrochloride with hydrochloric acid and which is obtained by amination of a conjugated diolefin by reacting a conjugated diolefin with an amine in the presence of a catalyst.

18. A method for defoliating a cotton plant which comprises applying to said plant a composition containing 0.1 to 10 percent by weight of di-tert-butyl polysulfide and a conjugated diolefin amination product prepared from butadiene and ammonia in a liquid phase in the presence of a catalyst, the said amination product and said sulfide being present in said composition in a weight ratio of .25:1 to 6:1, the said composition being diluted with a suitable carrier and applied at a rate to provide from ¼ to 20 pounds per acre of said sulfide and said amination product in the ratio as stated herein.

19. The method for defoliating a plant which comprises applying to said plant an organic polysulfide, having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an alkenylamine, the amount of the admixture applied being effective to cause a desired extent of defoliation.

20. A plant defoliating composition which comprises an organic polysulfide, having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an alkenylamine.

21. A plant defoliating composition which comprises an organic polysulfide, having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an amination product resulting from the reaction of a conjugated diolefin with ammonia.

22. The method for defoliating a plant which comprises applying to said plant an organic polysulfide, having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an amination product resulting from the reaction of a conjugated diolefin with ammonia, the amount of the admixture applied being effective to cause a desired extent of defoliation.

23. A plant defoliating composition which comprises a di-tert-butyl polysulfide and a synergistic proportion of tributenylamine.

24. A plant defoliating composition which comprises an organic polysulfide having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an amination product of butadiene and ammonia.

25. The method for defoliating a plant which comprises applying to said plant an organic polysulfide, having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an amination product of butadiene and ammonia, the amount of the admixture applied being effective to cause a desired extent of defoliation.

26. The method for defoliating a plant which comprises applying to the said plant in a suitable carrier in an effective amount of composition containing in admixture an organic polysulfide having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, and a synergistic proportion of an amination product of a conjugated diolefin prepared by reacting a 1,3-butadiene compound with a nitrogen-containing compound of the formula

wherein each R is selected from the group consisting of hydrogen, alkyl, aryl, aralkyl, alkaryl, cycloalkyl, heterocyclic, and hydrocarbon groups which together with the nitrogen form a heterocyclic ring, the number of carbon atoms in both R's not exceeding a total of 36.

27. A plant defoliating composition which comprises in admixture an organic polysulfide having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, and a synergistic proportion of an amination product of a conjugated diolefin prepared by reacting a 1,3-butadiene compound with a nitrogen-containing compound of the formula

wherein each R is selected from the group consisting of hydrogen, alkyl, aryl, aralkyl, alkaryl, cycloalkyl, heterocyclic, and hydrocarbon groups which together with the nitrogen form a heterocyclic ring, the number of carbon atoms in both R's not exceeding a total of 36.

28. A plant defoliating composition which comprises an organic polysulfide, having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an amination product resulting from the reaction of a conjugated diolefin with a primary amine.

29. A plant defoliating composition which comprises an organic polysulfide, having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an amination product resulting from the reaction of a conjugated diolefin with a secondary amine.

30. The method for defoliating a plant which comprises applying to said plant an organic polysulfide, having the general formula $RS_{(x)}R'$ wherein R and R' represent one of straight and branched-chain alkyl groups, cycloalkyl groups, aryl groups, and combinations thereof, $(x)$ represents an integer from two to five and wherein R and R' each contain at least three and not more than 10 carbon atoms and are not necessarily identical, in admixture with a synergistic proportion of an amination product resulting from the reaction of a conjugated diolefin with a primary amine, the amount of the admixture applied being effective to cause a desired extent of defoliation.

31. The method for defoliating a plant which comprises applying to said plant an organic polysulfide, having the general formula $RS_{(x)}R'$ wherein R and R' represent one of straight and branched-chain alkyl groups, cycloalkyl groups, aryl groups, and combinations thereof, $(x)$ represents an integer from to to five and wherein R and R' each contain at least three and not more than 10 carbon atoms and are not necessarily identical, in admixture with a synergistic proportion of an amination product resulting from the reaction of a conjugated diolefin with a secondary amine, the amount of the admixture applied being effective to cause a desired extent of defoliation.

No references cited.